(12) United States Patent
Schaepperle

(10) Patent No.: US 6,469,782 B1
(45) Date of Patent: Oct. 22, 2002

(54) METHOD OF DETECTING DISTORTIONS AND A RECEIVER FOR DISTORTED OPTICAL SIGNALS

(75) Inventor: Joerg Schaepperle, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/495,454

(22) Filed: Feb. 1, 2000

(30) Foreign Application Priority Data

Feb. 3, 1999 (DE) .......................................... 199 04 252

(51) Int. Cl.[7] .............................................. G01N 21/00
(52) U.S. Cl. ...................................................... 356/73.1
(58) Field of Search ........................ 356/73.1; 359/124, 359/125, 173, 153, 179

(56) References Cited

U.S. PATENT DOCUMENTS

| 3,968,427 A | * | 7/1976 | Sharrit | 324/57 |
| 4,551,019 A | * | 11/1985 | Vella et al. | 356/73.1 |
| 4,750,833 A | * | 6/1988 | Jones | 356/73.1 |
| 4,799,790 A | * | 1/1989 | Tsukamoto et al. | 356/73.1 |
| 5,191,462 A | * | 3/1993 | Gitlin et al. | 359/189 |
| 5,821,533 A | * | 10/1998 | Bingham et al. | 250/252.1 |
| 5,999,289 A | * | 12/1999 | Ihara et al. | 356/73.1 |
| 6,263,465 B1 | * | 7/2001 | Gehlot | 341/69 |

OTHER PUBLICATIONS

"Equalization of Bit Distortion Induced By Polarization Mode Dispersion" by H. Bulow, Proceedings 2 NOC 97, p. 65 to 72.

* cited by examiner

Primary Examiner—Frank G. Font
Assistant Examiner—Tu T. Nguyen
(74) Attorney, Agent, or Firm—Sughrue Mion, PLLC

(57) ABSTRACT

A method of detecting distortions of optical signals and a receiver for distorted optical signals are proposed, where the receiver comprises an opto-electric converter, an equalizer and a microprocessor, and the equalizer is connected to at least one distortion detector, and both the distortion detector and the equalizer are connected to a common control means via a microprocessor.

9 Claims, 4 Drawing Sheets

METHOD OF DETECTING DISTORTIONS AND A RECEIVER FOR DISTORTED OPTICAL SIGNALS

BACKGROUND OF THE INVENTION

The invention is based upon a method of detecting distortions of optical signals and upon a receiver for optical signals distorted due to dispersion effects as defined in the independent claims.

The publication "Equalisation of Bit Distortion Induced By Polarisation Mode Dispersion" by H. Büllow, Proceedings 2 NOC 97, p. 65 to 72, has disclosed methods of treating optical signals disturbed due to polarisation mode dispersion. This publication refers to several methods of processing the disturbed signals by suitable filtering in order to recover the undisturbed, information-bearing signal. Polarisation mode dispersion occurs as an effect of the birefringence of transmission glass fibres. The signal is split into signal components corresponding to the fast and slow axes of the birefringence tensor. The two signal components here are subject to different group velocities during transmission. This leads to a delay difference $\Delta t$. The power in the signal components is split between the two main axes and this power distribution is defined by the parameter $\gamma$. Polarisation mode dispersion is a function of the temperature and the transmission conditions on the glass fibre link and changes over time. To effectively compensate for polarisation mode dispersion it would be of value to measure the two parameters $\Delta \tau$ and $\gamma$. Such measurement of the parameters is as yet unknown. The quoted publication also simply processes the disturbed signals in the same way by filtering, and does not firstly define the parameters of the polarisation mode dispersion. However, for a rapid, adaptive, electronic equalization of optical signals distorted by polarisation mode dispersion, it is of great advantage to predetermine the distortion by measurement technology. The object of the invention is to very rapidly detect the two parameters of the polarisation mode dispersion, even in the event of strong distortions of the signal, for example in the case of a completely closed eye in an eye diagram.

SUMMARY OF THE INVENTION

The method according to the invention comprising the characterising features of the independent claim has the advantage that the parameters of the polarisation mode dispersion are directly measured, and the result is available for analysis for an equalizer. To measure the parameters of the polarisation mode dispersion (PMD), the input signal is firstly freed of its information content resulting from the modulation of the transmitted pulses, and the thus modified, disturbed signals are analyzed.

Further advantageous embodiments and improvements of the method are described in the sub-claims.

BRIEF DESCRIPTION OF THE DRAWINGS

Exemplary embodiments of the invention are illustrated in the drawings and explained in detail in the following description. In the drawings.

DETAILED DESCRIPTION OF THE INVENTION

Figure 1:
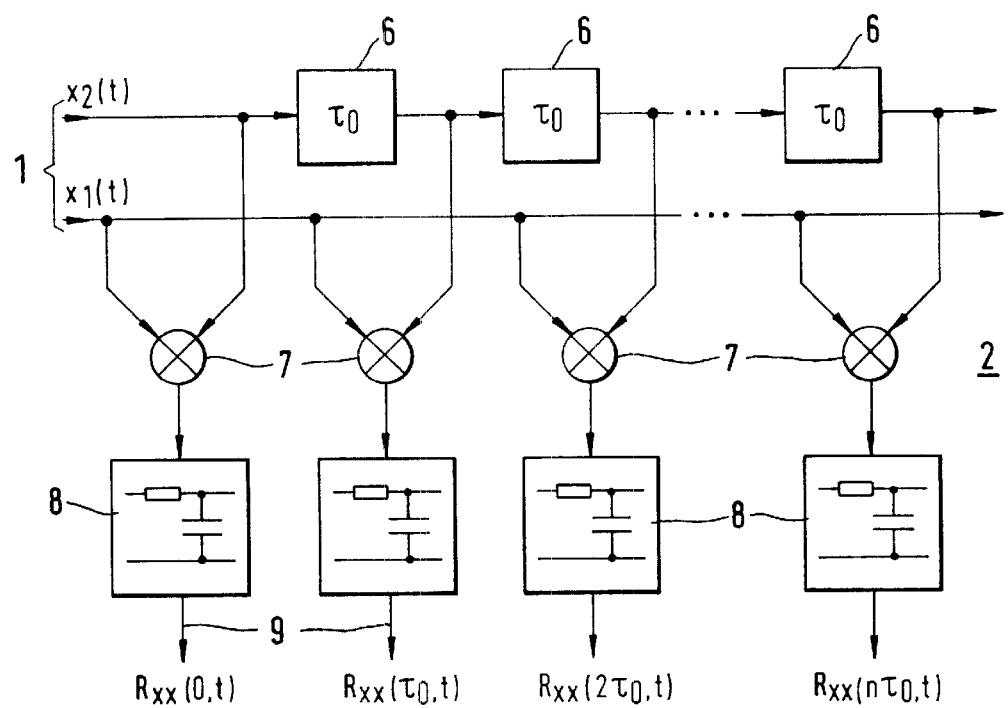
FIG. 1 illustrates a circuit for the detection of dispersion distortions.

FIG. 1 illustrates the circuit in a distortion detector 2. The input signal 1 is split between two signal branches. Delay elements 6 are integrated in the signal branch $x_2(t)$. The signal $X_2(t-\tau)$ and the other input signal $x_1(t)$ are fed to a multiplier 7. The multiplier in each case links the signal $x_1(t)$ with a signal $X_2(t-\tau)$ from the signal branch containing the delay elements 6. The output signal of the chain of delay elements and the fed-through signal $x_1(t)$ can be made available as output signals for further processing. The multipliers 7 are in each case connected to a low-pass filter 8, or more generally an integrator. The output signals 9 of the low-pass filters are available for further processing. For example, following an A/D conversion, the signals can be further processed by a signal processor. The signal $x_2(t)$, which is fed into the delay chain, can be generated from the input signal or can be generated, following filtering, in the optical receiver. The signal $x_1(t)$ distorted by polarisation mode dispersion arises from the transmitted signal $x_0(t)$, which in first approximation is undistorted, in accordance with $$x_1(t)=(1-\gamma)x_0(t)+\gamma x_0(t-\Delta t),$$

wherein the factor $\gamma$ indicates the power distribution between the polarisation modes and $\Delta t$ indicates the delay difference. The output signals of the low-pass filters represent sample values of the short-term autocorrelation function in respect of the variable $\tau$ at the points $\tau=k\cdot\tau_0$. They are dependent upon the time t and, when the pulse response of the low-pass filters h (t) is suitably selected, are directly related to the likewise time-dependent parameters $\Delta t$ and $\gamma$.

Figure 2:
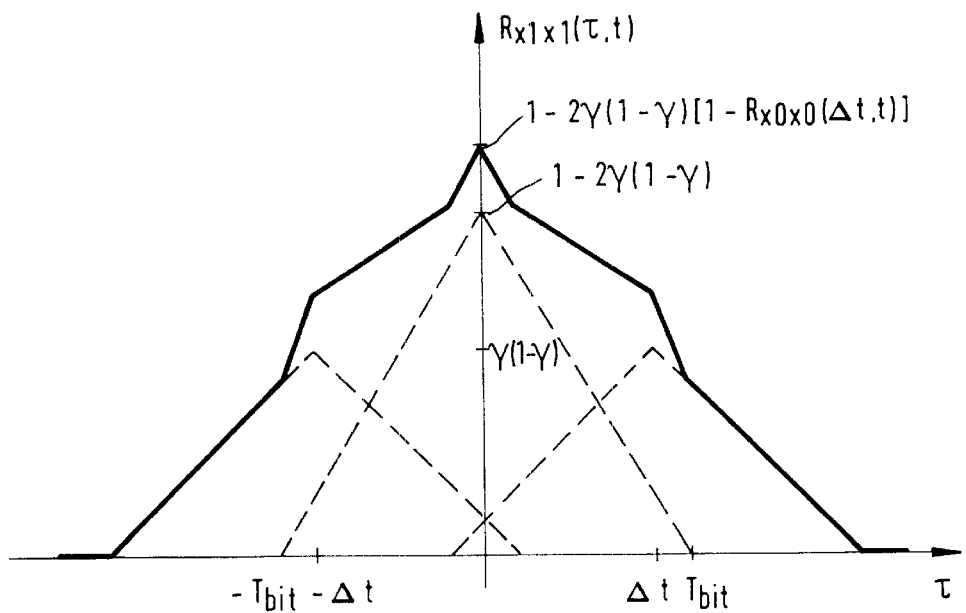
FIG. 2 illustrates an autocorrelation function of the PMD distortion over the axis $\tau$.

FIG. 2 illustrates the autocorrelation function for a binary signal $x_0$, free of direct components, of a square-wave pulse, with the amplitude $\pm 1$, the bit period $T_{bit}$ and $x_2(t)=x_1(t)$. This function consists of a sum of three triangular functions. $R_{x0x0}$ of $\tau$ is the autocorrelation function of the undistorted signal. The parameters $\Delta t$ and $\gamma$ of the polarisation mode dispersion can be defined from the sample values of the curve. From the parameters $\Delta t$ and $\gamma$, it is possible to calculate the coefficients of an adaptive transversal filter for equalizing the PMD-distorted signal.

Figure 3:
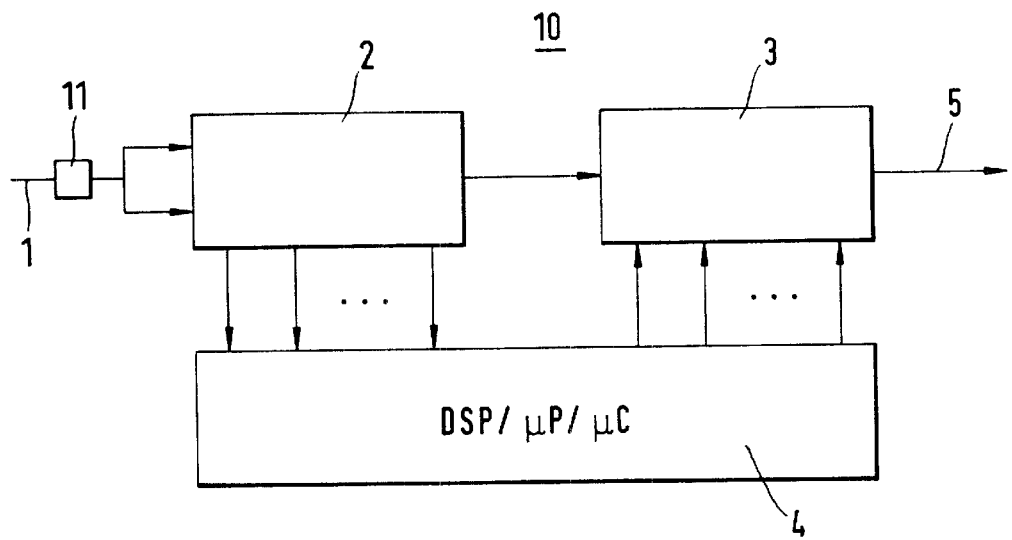
FIG. 3 illustrates an optical receiver with a controlled equalizer.

FIG. 3 illustrates an optical receiver 10 by way of an example. The input signal 1 is converted in an opto-electric converter 11. The signal is split into two branches which are applied to the input of a distortion detector 2. The output of the distortion detector 2 is connected to an equalizer 3. The parameters of the distortion detector 2 are fed into a microprocessor 4. These measured parameters are used to adjust the equalizer 3, which in turn is connected to the microprocessor 4.

Figure 4:
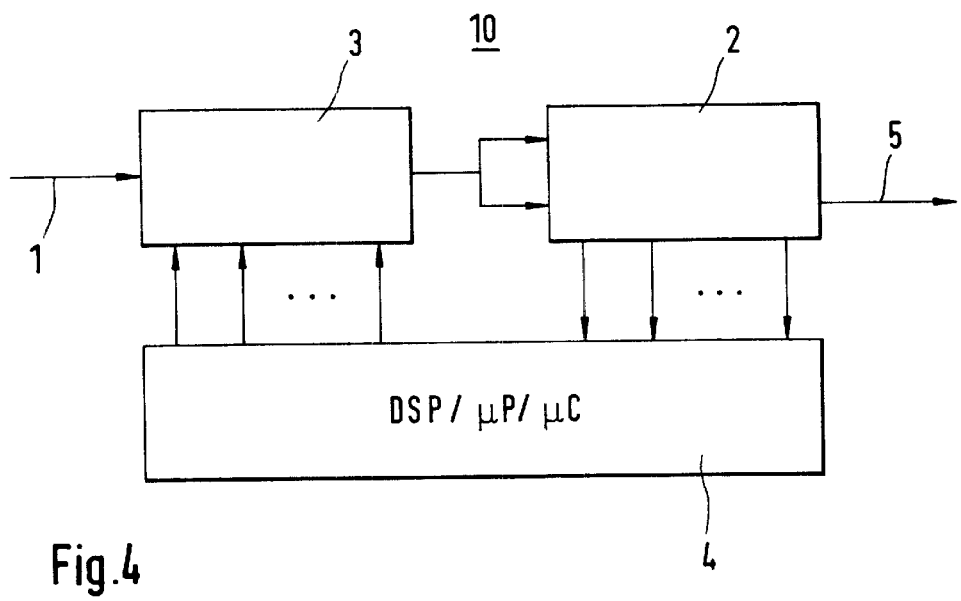
FIG. 4 illustrates an optical receiver with an automatically controlled equalizer.

In the embodiment illustrated in FIG. 4 the equalizer 3 is connected to the input data stream 1. The output of the equalizer is connected to the distortion detector 2. For the precise automatic control of the equalizer, if the circuit is supplied with the output signal of the equalizer as shown in FIG. 4, sample values at or above $T_{bit}$ can be used for example as controlled variable. The controlled variable is adjusted towards zero or is minimised. The breadth of the function illustrated in FIG. 2 is also directly related and can be used in the receiver as controlled variable to be minimised.

Figure 5:
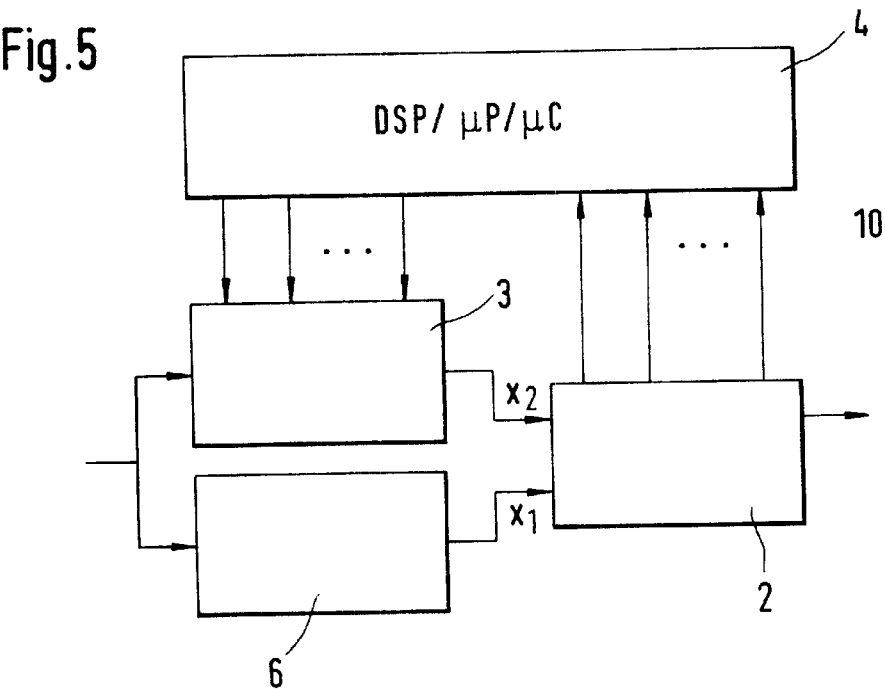
FIG. 5 illustrates an optical receiver for cross-correlation between distorted signal and equalized signal.

FIG. 5 illustrates another variant of the optical receiver 10 which has special advantages for signals subject to a γ of approximately 0.5. If, for the detection of the disturbance due to polarisation mode dispersion, the input signal 1 is only split into two signal branches so that $x_2(t)=x_1(t)$, the process cannot distinguish between γ>0.5 and γ<0.5. This disadvantage is avoidable if the distorted signal received by the optical receiver is applied to the input $x_1$ and a signal with no PMD distortion is fed in at the input $x_2$. An undistorted signal of this kind can be obtained for example at the output of the adaptive equalizer to be controlled. Due to the different sources of the signals, delay differences between the signals must be compensated for. Therefore a delay element 6 is to be provided which is connected to the distortion detector 2. In a border-line situation in which γ is exactly 0.5, the signal basically can no longer be equalized using a linear equalizer. In such cases it is necessary to provide an equalizer comprising a combination of a linear equalizer and, for example, a decision feedback equalizer.

Figure 6:
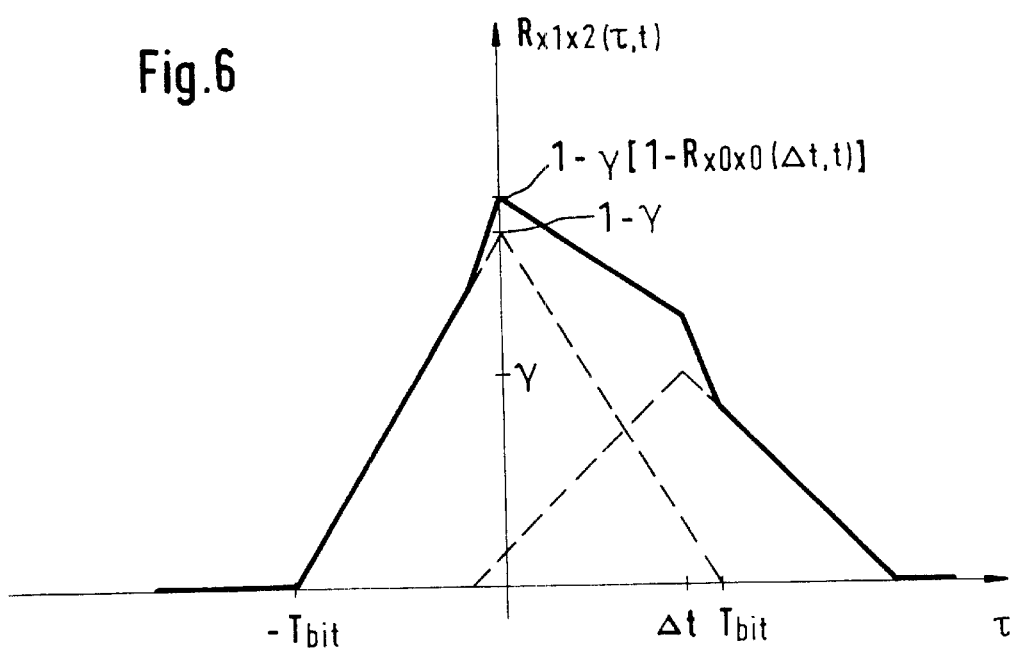
FIG. 6 illustrates the cross-correlation function according to FIG. 5.

FIG. 6 illustrates the autocorrelation function $R_{x1x2}$ for the case of different input signals $x_1$ and $x_2$. An asymmetrical cross-correlation is shown between the distorted input signal and the equalized signal, permitting. differentiation between the regions γ>0.5 and γ<0.5.

Figure 7:
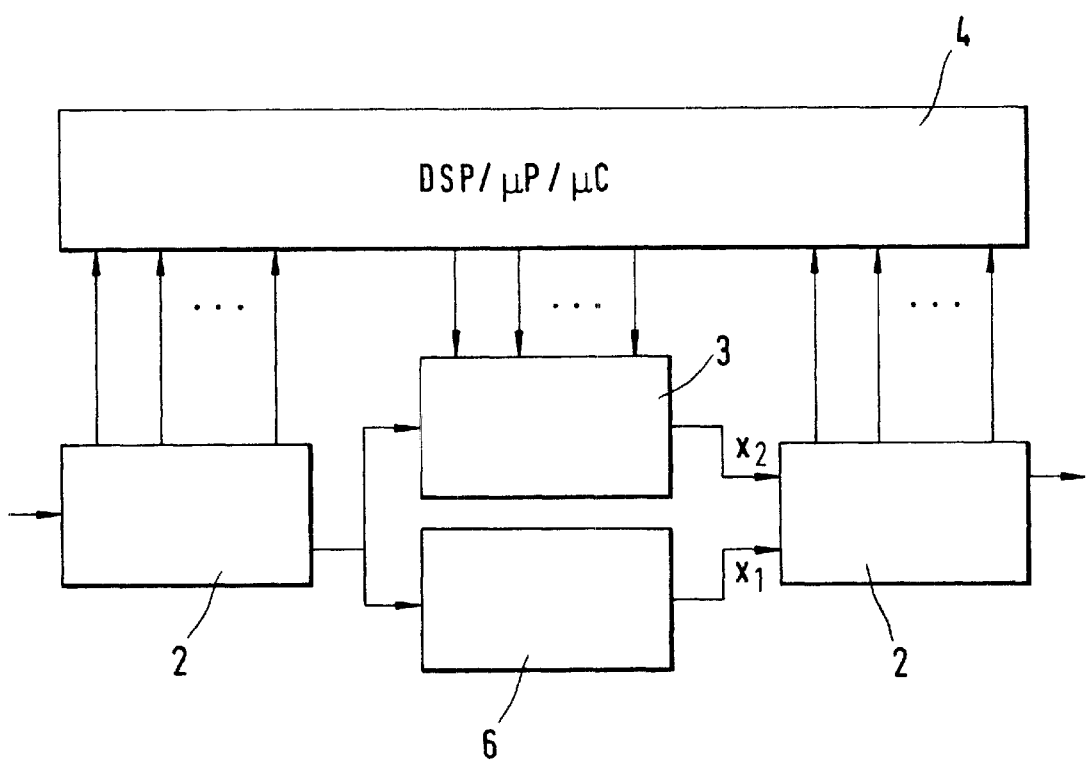
FIG. 7 illustrates an optical receiver with two detectors.

FIG. 7 illustrates an additional improvement of the optical receiver. Two detectors 2 are used to monitor the distorted signal and the equalized signal. Via the first distortion detector 2 the degree of the distortion is measured and the result is fed into the equalizer 3. The output of the equalizer 3 then contains fewer distorted signals $x_2$, while the distorted signals $x_1$ are fed into the second distortion detector 2 via the delay element 6. The results of the two distortion measurements are requested via the microcontroller 4 and lead to the adjustment of the equalizer.

In principle the method of detecting distortions is suitable for the detection of all distortions which affect the power density of the spectrum and can be used as measured variable for automatically controlling an adaptive filter. The analysis process must be appropriately adapted for use in the case of other distortions.

In the circuit according to FIG. 1 it is possible to use delay elements 6 with different delay times τ. It is also conceivable for the entire arrangement to be constructed with a variable delay and to omit a chain of delay elements. Then a multiplier and a low-pass filter are required and the sample values which supply the function according to FIG. 3 are obtained consecutively. However this procedure has the disadvantage that it is slower.

In contrast to pseudo-error monitors, the time-dependent distortions can also be detected in the case of a closed eye, i.e. in the case of very strong distortions of the optical signal. The speed of the detection, and thus the permissible speed of change of the time-dependent distortions, here is increased by the factor 1000. In contrast to band-pass filter solutions, the variables characteristic of the polarisation mode dispersion are directly determined in the time domain and thus can easily be converted into coefficient values for a transversal filter. Advantageously, the invention is implemented as an integrated circuit.

What is claimed is:

1. A method of detecting distortions due to dispersion effects of an optical transmission link, of an optical signal modulated in accordance with data being transmitted, said method comprising the steps of:

generating a signal corresponding to a received optical signal with its data modulation removed whereby the generated signal only contains information relating to the shape of pulses in said received signal and thus to the action of the dispersion effects upon the received signal; and measuring the distortions in said generated signal due to the dispersion effects.

2. A method of detecting distortion of a received optical signal due to dispersion effects of an optical transmission link, said method comprising the steps of:

generating first and second signals corresponding to the received optical signal;

feeding the first and second signals into a respective first and second branches of a detector such that the signals in the two branches are delayed in relation to one another;

multiplying the signals in said first and second branches with one another and integrating the multiplication results to integration; and analyzing the integration results in a microprocessor.

3. A method according to claim 2, wherein the first and second signals are directly formned from the input signal.

4. A method according to claim 2, further comprising the step of correcting said distortion in accordance with the resultsof said analysis, and wherein said first signal is formed from the received signal and said second signal is formed from a signal resulting from said correcting step.

5. A method according to claim 2, wherein the results of the integration represent a function $R_{x1x2}(τ, t)$ over τ, where x1 and x2 are said first and second signals, respectively, τ is the delay between said first and second signals, and sample values of the function define two parameters γ, Δt of a polarization mode dispersion.

6. A method according to claim 2, wherein the first and second signals are converted prior to feeding the first signal and the second signal into the detector.

7. A receiver for receiving optical signals over a transmission link, comprising an opto-electric converter, an equalizer and a microprocessor, wherein said receiver fifrther comprises at least one distortion detector, for detecting distortion in said optical signas due to dispersion effects of said transmission link, a common control circuit for controlling operation of both of said equalizer and distortion detector, and a microprocessor connecting both of said distortion detector and equalizer to said common control circuit, characterised in that the received optical signal is modulated in accordance with data being transmitted, wherein the distortion detector detects distortion of said optical signal due to dispersion effects of said transrntssion link, and wherein said distortion detector includes:

a circuit for generating a signal corresponding to the receivei optical signal with its data modulation removed, whereby the generated signal only contains information relating to the shape of pulses of in said received signal and thus to the action of the dispersion effects upon the received signal; and a circuit measuring the distortion in the generated signal.

8. A method of detecting distortions of optical signals due to dispersion effects of an optical transmission link, including:

splitting an input signal into a first signal and a second signal;

delivering the first signal to a first signal branch of a detector and the second signal to a second signal branch of the detector;

delaying a signal in the second signal branch of the detector in relation to the first signal in the first signal branch of the detector;

demodulating the input signal to obtain the distorted input signal including polarization mode dispersion components, the modulation present as a result of transmission of data through said optical transmission link, this demodulating further including:

multiplying the first signal in the first signal branch of the detector and the delayed signal in the second signal branch of the detector to obtain a plurality of multiplied signals; and integrating the multiplied signals such that resulting demodulated signals only contain information relating to the shape of the data transmitted through said optical transmission link and the polarization mode dispersion components; and delivering the resulting demodulated signals to a microprocessor for analysis.

9. A receiver for optical signals distorted due to dispersion effects of an optical transmission link, comprising:

an opto-electric converter;

an equalizer;

at least one distortion detector electrically connected with said equalizer and said optoelectric converter;

a microprocessor electrically connected with said at least one distortion detector and said equalizer;

means for splitting an input signal into a first signal and a second signal and delivering the first signal to a first signal branch of said distortion detector and the second signal to a second signal branch of said at least one distortion detector;

said at least one distortion detector including means for detecting distortions of said optical signals due to said dispersion effects of said optical transmission link, the means for detecting distortions further including:

means for delaying a signal in the second signal branch of the at least one distortion detector in relation to the first signal in the first signal branch of the at least one distortion detector;

means for demodulating the input signal to obtain the distorted input signal including polarization mode dispersion components, the modulation present as a result of transmission of data through said optical transmission link, the means for demodulating further including:

means for multiplying the first signal in the first signal branch of the at least one distortion detector and the delayed signal in the second signal branch of the at least one distortion detector to obtain a plurality of multiplied signals; and means for integrating the multiplied signals such that the resulting demodulated signals only contain information relating to the shape of the data transmitted through said optical transmission link and the polarization mode dispersion components; and means for delivering the resulting demodulated signals to a microprocessor for analysis.

\* \* \* \* \*